Patented Mar. 16, 1926.

1,576,739

UNITED STATES PATENT OFFICE.

ALFRED W. GAUGER AND HENRY HERMAN STORCH, OF WESTEND, CALIFORNIA, ASSIGNORS TO BURNHAM CHEMICAL COMPANY, OF RENO, NEVADA, A CORPORATION OF NEVADA.

PROCESS OF RECOVERING SODIUM CHLORIDE FROM SALINE LIQUORS.

No Drawing. Application filed February 16, 1925. Serial No. 9,414.

*To all whom it may concern:*

Be it known that we, ALFRED W. GAUGER and HENRY HERMAN STORCH, citizens of the United States, and residents of Westend, county of San Bernardino, State of California, have invented a certain new and useful Process of Recovering Sodium Chloride from Saline Liquors, of which the following is a specification.

The invention relates to a process of recovering sodium chloride from saline liquors containing the same and other salts and particularly from the brines of the alkali lakes of the western United States.

An object of the invention is to provide a cheap and economical process for recovering sodium chloride from saline liquors containing the same, in a crude state, sufficiently pure to be cheaply and economically refined.

Another object of the invention is to provide a process of accelerating the solar evaporation of brine for the purpose of recovering salts therefrom.

The invention possesses other advantageous features, some of which with the foregoing will be set forth at length in the following description where we shall outline in full one form of the process of our invention. We shall describe the process as applied to the brine of Searles Lake, in California, but it is to be understood that the process is not limited to this particular brine.

Searles Lake brine contains sodium and potassium chloride, sulfate, carbonate, bicarbonate and borate. By the process of our invention, we are able to employ natural temperatures for evaporation and, while we prefer to employ natural temperatures, artificial heating may be employed in carrying out the process.

In accordance with our invention, the liquor or brine is pumped into deep ponds or vats. We have obtained excellent results with depths of brine varying from 4 feet to 8 feet and in excess of 8 feet. These ponds are formed in the open so that the brine therein is exposed to the action of the sun and wind and, in these ponds, the brine is permitted to evaporate until from one-fourth to two-thirds of the water has been evaporated off, the amount of water being evaporated depending upon the season of the year. During the evaporation various salts crystallize out at various stages of the concentration, these salts comprising sodium chloride, sodium sulfate and sodium carbonate. The borate and metaborate remain in solution and increase in concentration.

Many advantages are gained by subjecting the liquor to the action of the sun and wind in deep ponds. Due to the large mass of the liquor, the liquor does not materially chill at night, but maintains a more uniform and elevated temperature. Due to the large area of the pond, the wind, blowing across the pond, produces sufficient wave action to prevent the formation of a scum of crystallized salt over the surface of the liquor, which would minimize or interfere with the evaporation. The depth of the brine in the pond is sufficient so that the rays of the sun are not reflected upward out of the pond from the bottom of the pond or from the crystals lying on the bottom. In this manner, all of the heat of the rays of the sun is absorbed by the brine, greatly increasing its rate of temperature rise. The lower portion of the body of the liquor in the pond acts as a black body and absorbs the heat of the sun's rays, so that there is no reflection of the rays from the pond other than surface reflection. Thus, by employing a large, deep pond, evaporation of the liquor is accomplished at a relatively rapid rate.

The salts deposited in the deep evaporating pond will contain a high percentage of sodium chloride. To recover the sodium chloride from the mixture of crystals, the mixture is preferably ground to such fineness that the major portion thereof will readily pass through a screen having 30 apertures to the linear inch. This finely ground material is then washed with a liquor which is saturated with sodium chloride, to wash out the sodium sulfate and sodium carbonate. Crude Searles Lake liquor is admirably suited to this purpose, since such liquor is saturated with sodium chloride but is not saturated with sodium sulfate and sodium carbonate. The sodium chloride remaining is given a final washing with brackish or fresh water, which removes adhering brine and final traces of impurity. The wash waters are preserved and are subsequently treated to recover the salts therein.

We claim:

1. The process of recovering sodium chloride from liquors containing the same and other salts, which comprises evaporating the liquor whereby sodium chloride and other salts are crystallized out, separating the deposited crystals from the concentrated liquor, grinding the crystals to finely divided form and washing the ground crystals with original liquor to wash out the other salts.

2. The process of recovering sodium chloride from liquors containing the same and other salts, which comprises evaporating the liquor whereby sodium chloride and other salts are crystallized out, separating the deposited crystals from the concentrated liquor, grinding the crystals to finely divided form, and washing the salts with a liquor saturated with sodium chloride, whereby the other salts are washed out.

3. The process of recovering sodium chloride from liquors containing the same and other salts, which comprises evaporating the liquor whereby sodium chloride and other salts are crystallized out, separating the deposited crystals from the concentrated liquor, grinding the crystals to finely divided form, and washing the ground material with the original liquor saturated with sodium chloride whereby the other salts are washed out.

4. The process of recovering sodium chloride from liquors containing the same and other salts, which comprises evaporating the liquor whereby sodium chloride and other salts are crystallized out, separating the deposited crystals from the concentrated liquor, grinding the crystals to finely divided form, washing the ground material with original liquor to remove the other salts and washing the ground material with water to remove adhering liquor.

5. The process of recovering sodium chloride from liquors containing sodium sulfate and sodium carbonate and saturated with sodium chloride which comprises evaporating the liquor whereby sodium chloride, sodium sulfate and sodium carbonate are crystallized out, separating the deposited crystals from the concentrated liquor, grinding the crystals to finely divided form, washing the ground material with original liquor to wash out the sodium sulfate and sodium carbonate and washing the remaining material to remove contained impurities.

6. The process of recovering sodium chloride from liquors containing sodium sulfate and sodium carbonate and saturated with sodium chloride which comprises evaporating the liquor until two-thirds of the water has been evaporated off whereby sodium chloride, sodium sulphate and sodium carbonate are crystallized out, separating the deposited crystals from the concentrated liquor, grinding the crystals to a size which will readily pass through a screen having 30 apertures to the linear inch, washing the ground material with original liquor to wash out the sodium sulphate and sodium carbonate, and washing the remaining material to remove contained impurities.

In testimony whereof, we have hereunto set our hands.

ALFRED W. GAUGER.
HENRY HERMAN STORCH.